(12) United States Patent

Springer et al.

(10) Patent No.: US 11,310,481 B2
(45) Date of Patent: Apr. 19, 2022

(54) IMAGING DEVICE, SYSTEM, METHOD AND PROGRAM FOR CONVERTING A FIRST IMAGE INTO A PLURALITY OF SECOND IMAGES

(71) Applicant: Sony Corporation, Tokyo (JP)

(72) Inventors: Paul Springer, Stuttgart (DE); Thimo Emmerich, Stuttgart (DE); Zoltan Facius, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/170,635

(22) Filed: Oct. 25, 2018

(65) Prior Publication Data

US 2019/0132579 A1 May 2, 2019

(30) Foreign Application Priority Data

Oct. 26, 2017 (EP) .................................... 17198705

(51) Int. Cl.
*H04N 13/282* (2018.01)
*H04N 5/235* (2006.01)
(Continued)

(52) U.S. Cl.
CPC .......... *H04N 13/282* (2018.05); *G02B 13/16* (2013.01); *G02B 27/08* (2013.01); *G02B 27/10* (2013.01); *G02B 27/106* (2013.01); *G02B 27/1013* (2013.01); *G02B 27/14* (2013.01); *H04N 5/232* (2013.01); *H04N 5/2353* (2013.01); *H04N 5/2354* (2013.01); *H04N 5/232123* (2018.08);
(Continued)

(58) Field of Classification Search
CPC ............. H04N 5/232123; H04N 5/232; H04N 5/2353; H04N 5/2354; H04N 13/282; H04N 2005/2255; H04N 2013/0081; G02B 13/16; G02B 27/18; G02B 27/10; G02B 27/1013; G02B 27/106; G02B 27/14
See application file for complete search history.

(56) References Cited

U.S. PATENT DOCUMENTS 5,812,729 A * 9/1998 Allison .................... G02B 6/02
385/123
10,477,181 B2 * 11/2019 El Choubassi ...... H04N 13/282
(Continued)

FOREIGN PATENT DOCUMENTS

| JP | 2001-204683 A | 7/2001 |
|---|---|---|
| JP | 2003-20405 A | 1/2003 |
| WO | 2014/124982 A1 | 8/2014 |

*Primary Examiner* — Maria E Vazquez Colon
(74) *Attorney, Agent, or Firm* — Xsensus, LLP

(57) ABSTRACT

An imaging device for converting a first image into a plurality of second images, the imaging device comprising a light receiving unit having a first aperture configured to receive light of the first image, a light reflecting unit configured to reflect the light received by the light receiving unit along a number of paths having a predetermined number of reflections within the light reflecting unit according to a portion of the first aperture from which the light originated, and a light output unit configured to output at least a subset of the paths of light reflected by the light reflecting unit as a plurality of second images, the second images having a focal length associated with the predetermined number of reflections experienced by the corresponding paths of light through the light reflecting unit.

16 Claims, 10 Drawing Sheets

(51) Int. Cl.
    *H04N 5/232*     (2006.01)
    *G02B 13/16*     (2006.01)
    *G02B 27/10*     (2006.01)
    *G02B 27/08*     (2006.01)
    *G02B 27/14*     (2006.01)
    *H04N 13/00*     (2018.01)
    *H04N 5/225*     (2006.01)

(52) U.S. Cl.
    CPC ............... *H04N 2005/2255* (2013.01); *H04N 2013/0081* (2013.01)

(56) References Cited

U.S. PATENT DOCUMENTS

| | | | |
|---|---|---|---|
| 2003/0164952 A1 | 9/2003 | Deichmann et al. | |
| 2005/0271341 A1* | 12/2005 | Riches | G02B 27/1013 385/133 |
| 2010/0053354 A1* | 3/2010 | Hayasaka | H04N 5/2254 348/222.1 |
| 2011/0098533 A1 | 4/2011 | Onoda et al. | |
| 2013/0342526 A1* | 12/2013 | Ng | G06T 19/00 345/419 |
| 2014/0016016 A1* | 1/2014 | Berestov | H04N 13/239 348/345 |
| 2016/0091701 A1* | 3/2016 | Raghunathan | G02B 21/367 348/80 |
| 2016/0191897 A1* | 6/2016 | Small | G06T 5/50 348/49 |
| 2017/0099479 A1* | 4/2017 | Browd | A61B 34/20 |
| 2017/0257619 A1* | 9/2017 | Kashima | A61B 1/04 |

\* cited by examiner

IMAGING DEVICE, SYSTEM, METHOD AND PROGRAM FOR CONVERTING A FIRST IMAGE INTO A PLURALITY OF SECOND IMAGES

CROSS-REFERENCE TO RELATED APPLICATION

The present application claims priority to European Patent Application 17198705.0 filed by the European Patent Office on 26 Oct. 2017, the entire contents of which being incorporated herein by reference.

BACKGROUND

Field of the Disclosure

The present disclosure generally relates to an imaging device, system, method and program for converting a first image into a plurality of second images.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

A two-dimensional (2D) image of an object or scene provides a single visual perspective of the object or scene and does not capture important information relating to the distribution of that object or scene in real world three-dimensional (3D) space. That is, a 2D image captures a single projection of a 3D object or scene onto a 2D plane and can not fully convey depth information relating to the object or scene. In contrast, a 3D image captures enhanced information regarding the distribution of the object or scene throughout real world 3D space. As such there are situations, such as work requiring high precision orientation or analysis, where an advantage could be obtained through the use of 3D visualization techniques.

The depth information required to produce 3D images can be obtained by exploiting the disparity between 2D images of an object or scene captured from a different positions. A particular problem for 3D imaging devices capable of producing a 3D image from the disparity between 2D images is therefore how to reliably and efficiently capture the alternative visual perspectives of an object or scene.

Typically 3D imaging devices use a stereoscopic lens system in order to produce the depth information required for the production of 3D images. Each of the separate objective lenses in a stereoscopic lens system captures a single unique perspective of the object or scene. In order to limit the distortion created by optical misalignment of the separate objective lenses, the optical path of light through each of the objective lenses should be as close as possible. However, the incorporation of two identical optical paths is both complex and expensive. Furthermore in certain situations where 3D imaging may be advantageous, such as in the field of medical imaging, the inherent size of a stereoscopic system with multiple objective lenses may exceed the physical limits and constraints of the imaging system for a given application. This causes further problems for the implementation of 3D imaging in these situations.

Certain devices, such as plenoptic cameras, are capable of producing 3D images using a single objective lens. However, these systems require complex dedicated micro-optical components. Such dedicated micro-optical components are expensive and substantially increase the cost of the imaging device. Moreover, many of the standard optical components used in a 2D imaging device are incompatible with the micro-optical components and can not be used in the 3D imaging system. The integration of 3D imaging into a standard pre-existing 2D imaging device is therefore both complex and costly.

As such, there is a demand for a device capable of producing depth information and 3D images using a single compact optical device which can be efficiently incorporated into pre-existing 2D imaging devices without substantially increasing the size or cost of the imaging device itself. It is an aim of the present disclosure to address this issue.

SUMMARY

According to embodiments of the disclosure, an imaging device is provided that comprises a light receiving unit having a first aperture configured to receive light of the first image, a light reflecting unit configured to reflect the light received by the light receiving unit along a number of paths having a predetermined number of reflections within the light reflecting unit according to a portion of the first aperture from which the light originated, and a light output unit configured to output at least a subset of the paths of light reflected by the light reflecting unit as a plurality of second images, the second images having a focal length associated with the predetermined number of reflections experienced by the corresponding paths of light through the light reflecting unit.

According to embodiments of the disclosure, a method of operating an imaging device for converting a first image into a plurality of second images is provided, the method comprising: controlling a light receiving unit of the imaging device having a first aperture to receive light of the first image; controlling a light reflecting unit of the imaging device to reflect the light received by the light receiving unit along a number of paths having a predetermined number of reflections within the light reflecting unit according to a portion of the first aperture from which the light originated; and controlling a light output unit of the imaging device to output at least a subset of the paths of light reflected by the light reflecting unit as a plurality of second images, the second images having a focal length associated with the predetermined number of reflections experienced by the corresponding paths of light through the light reflecting unit.

According to embodiments of the disclosure, a program for controlling a computer to perform the above-mentioned method is provided.

According to embodiments of the disclosure, a storage medium storing the above-mentioned program is provided.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
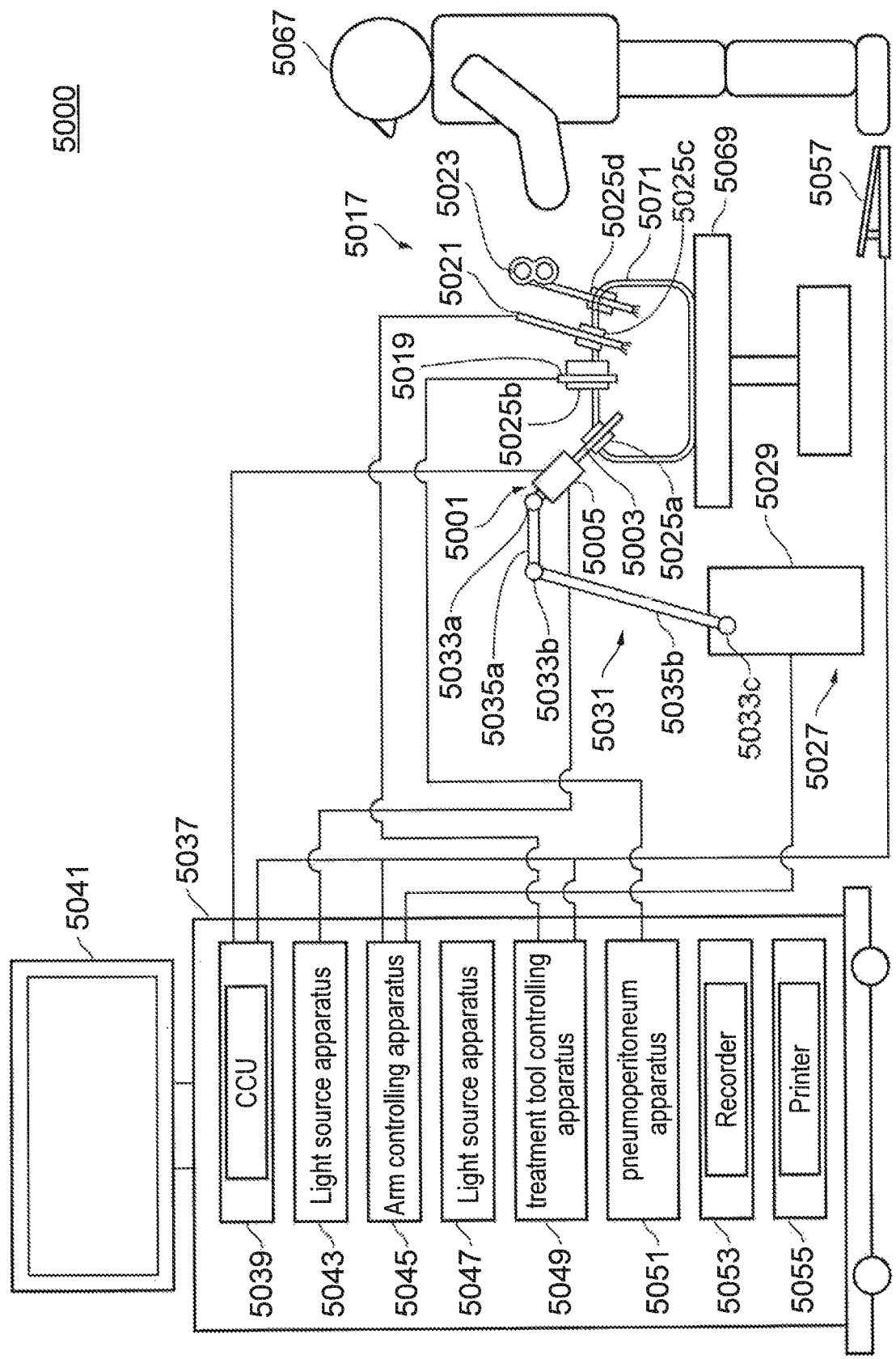
FIG. 1 is a view depicting an example of a schematic configuration of an endoscopic surgery system to which the technology according to an embodiment of the present disclosure can be applied.

Referring now to the drawings, wherein like reference numerals designate identical or corresponding parts throughout the several views.
Application
<<Application>>

The technology according to an embodiment of the present disclosure can be applied to various products. For example, the technology according to an embodiment of the present disclosure may be applied to an endoscopic surgery system, surgical microscopy or medical imaging device or other kind of industrial endoscopy in, say pipe or tube laying or fault finding.

FIG. 1 is a view depicting an example of a schematic configuration of an endoscopic surgery system 5000 to which the technology according to an embodiment of the present disclosure can be applied. In FIG. 1, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body lumens of the patient 5071 through the trocars 5025a to 5025d. In the example depicted, as the other surgical tools 5017, a pneumoperitoneum tube 5019, an energy treatment tool 5021 and forceps 5023 are inserted into body lumens of the patient 5071. Further, the energy treatment tool 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, a pair of tweezers or a retractor may be used.

An image of a surgical region in a body lumen of the patient 5071 imaged by the endoscope 5001 is displayed on a display apparatus 5041. The surgeon 5067 would use the energy treatment tool 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy treatment tool 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body lumen of the patient 5071, and a camera head 5005 connected to a proximal end of the lens barrel 5003. In the example depicted, the endoscope 5001 is depicted which includes as a hard mirror having the lens barrel 5003 of the hard type. However, the endoscope 5001 may otherwise be configured as a soft mirror having the lens barrel 5003 of the soft type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body lumen of the patient 5071 through the objective lens. It is to be noted that the endoscope 5001 may be a direct view mirror or may be a perspective view mirror or a side view mirror.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy treatment tool 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy treatment tool 5021 for cautery or incision of a tissue, sealing of a blood vessel or the like. A pneumoperitoneum apparatus 5051 feeds gas into a body lumen of the patient 5071 through the pneumoperitoneum tube 5019 to inflate the body lumen in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 1, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body lumen of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the surgery room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each colour (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colours can be picked up time-divisionally. According to the method just described, a colour image can be obtained even if a colour filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. This may include, but not be limited to laser light such as that provided by a Vertical Cavity surface laser or any kind of laser light. Alternatively or additionally, the light may be InfraRed (IR) light. In special light observation, for example, by utilizing the wavelength dependency of absorption of light in a body tissue to irradiate light of a narrower band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above. The light source may also apply a heat pattern to an area. This heat pattern will be explained later with reference to FIGS. 3A-C. The light source apparatus 5043 is, in embodiments, a Vertical Cavity Surface-Emitting Laser (VCSEL) which can produce light in the visible part of the electromagnetic spectrum and some produce light in the Infra-Red part of the electromagnetic spectrum. In this respect, the light source apparatus 5043 may also act as a visible light source illuminating the area. The light source apparatus 5043 is, in embodiments, one or more Vertical Cavity Surface-Emitting Laser (VCSEL) which can produce light in the visible part of the electromagnetic spectrum and some produce light in the Infra-Red part of the electromagnetic spectrum. In this respect, the light source apparatus 5043 may also act as a visible light source illuminating the area. The one or more VCSELs may be single wavelength narrowband VCSELs, where each VCSEL varies in emission spectral frequency. Alternatively, or additionally, one or more of the VCSELs may be a Micro Electro Mechanical system (MEMs) type VCSEL whose wavelength emission may be altered over a specific range. In embodiments of the disclosure, the wavelength may alter over the range 550 nm to 650 nm or 600 nm to 650 nm. The shape of the VCSEL may vary such as a square or circular shape and may be positioned at one or varying positions in the endoscope 5001.

The light source apparatus 5043 may illuminate one or more areas. This may be achieved by selectively switching the VCSELs on or by performing a raster scan of the area using a Micro Electro Mechanical system (MEMs). The purpose of the light source apparatus 5043 is to perform Spatial Light Modulation (SLM) on the light over the area. This will be explained in more detail later.

It should be noted that although the foregoing describes the light source apparatus 5043 as being positioned in the cart, the disclosure is not so limited. In particular, the light source apparatus may be positioned in the camera head 5005.

(Camera Head and CCU)

Figure 2:
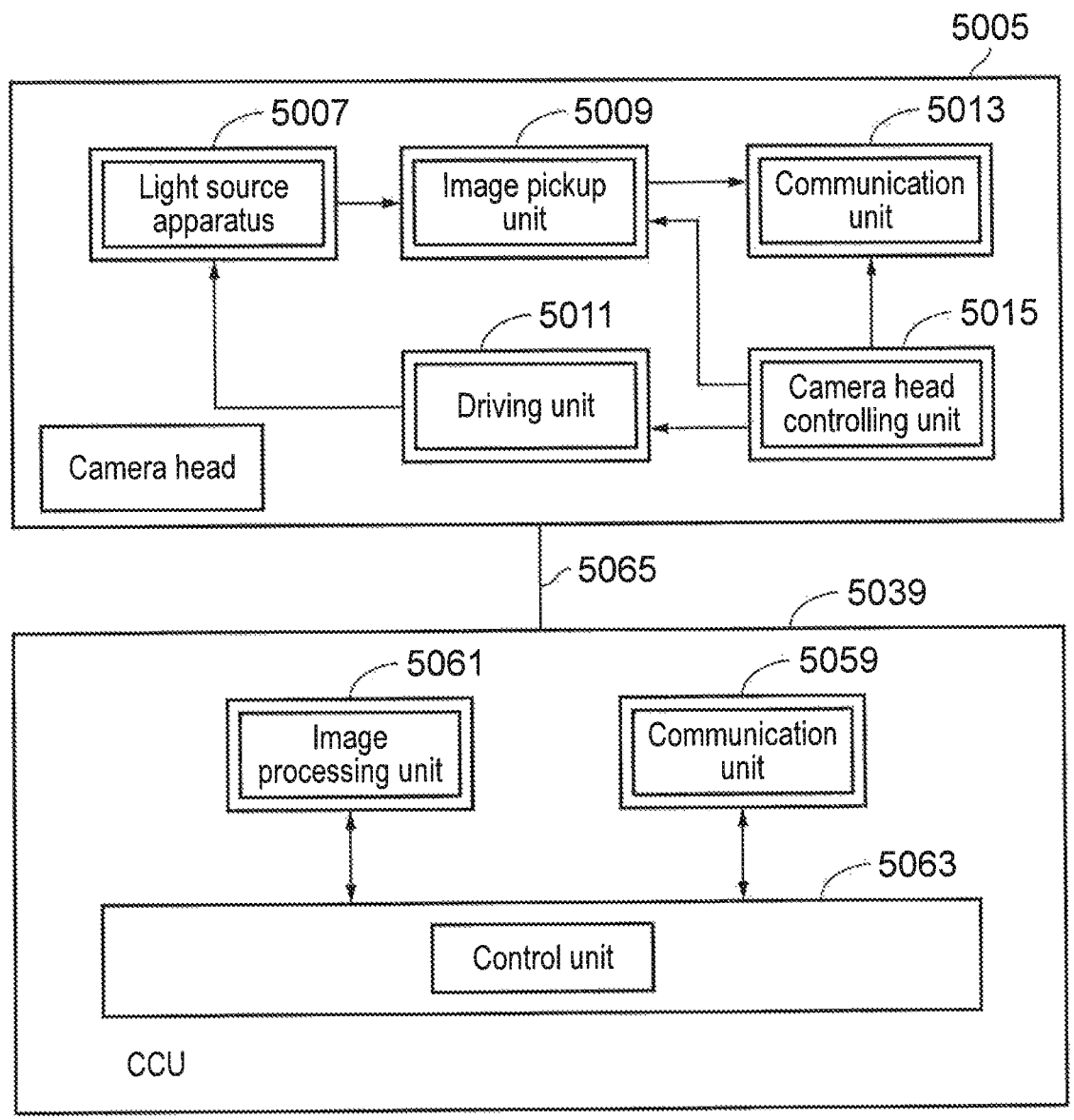
FIG. 2 is a block diagram depicting an example of a functional configuration of the camera head and the CCU depicted in FIG. 1.

Functions of the camera head 5005 of the endoscope 5001 and the CCU 5039 are described in more detail with reference to FIG. 2. FIG. 2 is a block diagram depicting an example of a functional configuration of the camera head 5005 and the CCU 5039 depicted in FIG. 1.

Referring to FIG. 2, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionaly communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in colour. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated.

Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy treatment tool 5021 is used and so forth by detecting the shape, colour and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fibre ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the surgery room. Therefore, such a situation that movement of medical staff in the surgery room is disturbed by the transmission cable 5065 can be eliminated.

Figure 3:
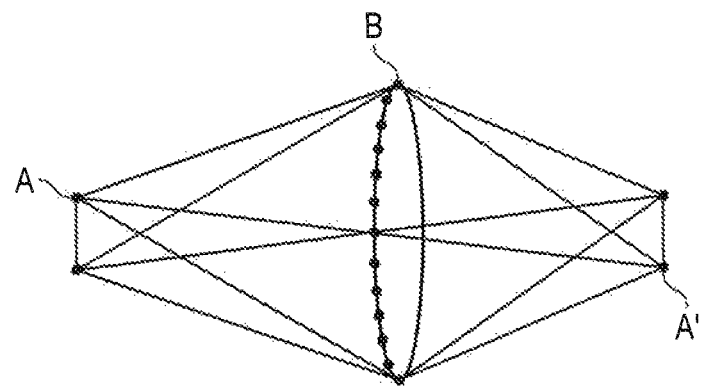
FIG. 3 is a diagram of an image formed by a known lens.

FIG. 3 is a diagram of an image formed by a conventional lens. Light from object A radiates uniformly outwards in all directions (it will be appreciated that only a subset of the optical paths encountered by lens B are depicted in this example). The lens B captures light from object A from a continuum of perspectives. That is, the light encountering the top portion of the lens B forms a first perspective of the object A and the light encountering the bottom of the lens B forms a second perspective of the object A. The number of perspectives captured by the lens is not limited to the number depicted in the example, but rather forms a continuum of perspectives from the top of the lens B to the bottom of the lens B. The greatest disparity, or in other words shift of visual perspective, between the paths of light is formed between the light encountered by the top portion of the lens B and the light captured by the bottom portion of the lens B. The individual perspectives of the object A, from the different paths of light, are averaged on the image plane of the lens B. That is, a single image of the object A' is formed on the image plane of lens B, where the light from the different paths, containing the different perspectives of the object A, converges.

An imaging device according to embodiments of the disclosure may be placed at the image plane of a conventional lens or imaging system, such as the image plane of the lens B in FIG. 3, and may convert the first image of the object A' into a plurality of second images of the object A by separating the paths of light, or different visual perspectives of the object A, that were averaged in the image plane of lens B.

Figure 4:
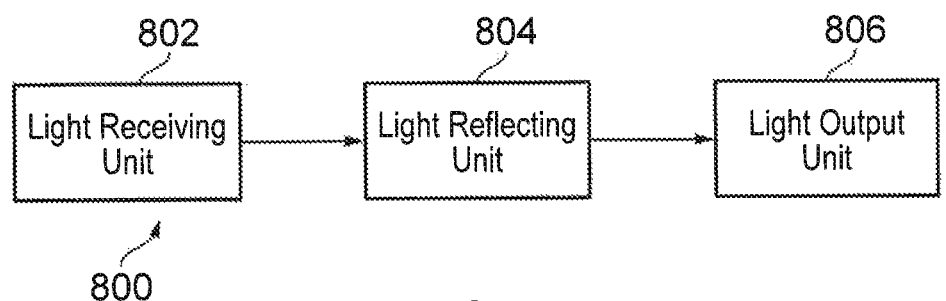
FIG. 4 shows an imaging device for converting a first image into a plurality of second images according to embodiments of the disclosure.

FIG. 4 shows an imaging device 800 for converting a first image into a plurality of second images according to embodiments of the disclosure. The imaging device 800 comprises a light receiving unit 802, a light reflecting unit 804 and a light output unit 806.

The light receiving unit 802 may have a first aperture and is configured to receive light of a first image, the light reflecting unit 804 is configured to reflect the light received by the light receiving unit 802 along a number of paths having a predetermined number of reflections within the light reflecting unit 804 according to a portion of the first aperture from which the light originated and the light output unit 806 is configured to output at least a subset of the paths of light reflected by the light reflecting unit 804 as a plurality of second images, the second images having a focal length associated with the predetermined number of reflections experienced by the corresponding paths of light through the light reflecting unit 804.

In operation, the light receiving unit 802 receives light from an object or scene through a first aperture. The light receiving unit 802 may be configured for the alignment of the light rays as they enter the imaging device 800. For example, according to embodiments of the disclosure, the light receiving unit 802 may generate a convergence point of the light of the object or scene at a certain distance from the light receiving unit 802. The light receiving unit 802 may comprise a single lens or may comprise any arrangement or configuration of lenses including, for example, biconvex, plano-convex, plano-concave and biconcave lenses. It will be appreciated that the light receiving unit 802 may be any other type of instrument, as long as light travels through the light receiving unit 802 into the light reflecting unit 804 of the imaging device 800.

Light received by the light receiving unit 802 enters the light reflecting unit 804. For example, light reflecting unit 804 may have an open portion through which light from the light receiving unit 802 enters the light reflecting unit 804. The light reflecting unit 804 is configured to reflect the light received by the light receiving unit 802 along a number of paths having a predetermined number of reflections within the light reflecting unit 802 according to a portion of the first aperture from which the light originated. The light reflecting unit 804 may be located after the light receiving unit 802 and before the light output unit 806. It will be appreciated that the specific placement of the light reflecting unit 804 in the imaging device 800 is not particularly limited provided that light received by the light receiving unit 802 enters the light receiving unit 804 and light from the light reflecting unit 804 enters the light output unit 806.

It will be appreciated that there may be multiple paths through the light reflecting unit 804 along which light from the light receiving unit 802 may travel. For example, light may travel directly through the light reflecting unit 804 without experiencing any reflections. Alternatively, light may pass through the light reflecting unit 804 along paths which have a single or multiple reflections within the light reflecting unit 804. The number of reflections that light from the light receiving unit 802 may experience in the light reflection unit 804 depends on the configuration of the imaging device 800. The imaging device 800 is configured such that the path light travels along through the light reflecting unit 804 is determined according to a portion of the first aperture from which the light originated. That is, the light reflecting unit 804 is configured to separate the paths of light, or in other words the different perspectives of an object or scene, that were averaged in the single image that was received by the light receiving unit 802.

It will be appreciated that the physical properties of the light reflecting unit such as its height, width and length, are not particularly limited and depend on the context in which the imaging device 800 according to embodiments of the disclosure is being implemented. The number of second images produced by the imaging device 800 depends at least in part on the physical properties including the height width and length of the light reflecting unit. The configuration of the imaging device 800 including the configuration of the light reflecting unit 804 will be discussed in more detail in the next section.

It will be appreciated that the two-dimensional cross section of the light reflecting unit is not particularly limited and may be any shape, for example triangular, quadratic or hexagonal provided the light reflecting unit is configured to reflect light received by the light receiving along a number of paths having a predetermined number of reflections within the light reflecting unit according to a portion of the first aperture from which the light originated. The arrangement of second images output by the light output unit 806 depends at least in part on the two-dimensional cross section of the light reflecting unit. For example, in a specific example of a quadratic light reflecting unit, the plurality of second images output by the light output unit 806 of the imaging device 800 may be arranged in a grid.

Accordingly, an imaging device 800 is able to convert a first image into a plurality of second images, the second images having a focal length associated with the predetermined number of reflections experienced by the corresponding paths of light through the light reflecting unit. That is, the imaging device separates the plurality of visual perspectives that were averaged at the image plane of a single objective lens.

The light reflecting unit 804 according to embodiments of the disclosure will now be discussed in more detail.

Figure 5A:
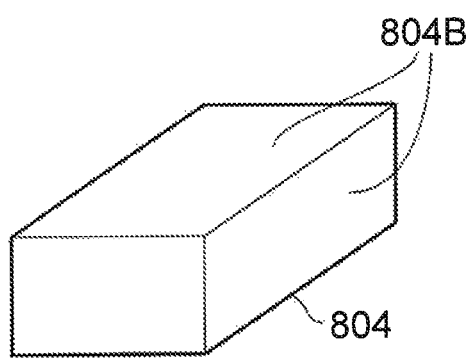
FIG. 5A shows a light reflecting unit according to embodiments of the disclosure.

FIG. 5A shows a light reflecting unit 804 according to embodiments of the disclosure. The light reflecting unit 804 may comprise a solid rod having a refractive index such that the light received by the light receiving unit 802 is reflected along a number of paths having a predetermined number of reflections within the light reflecting unit by total internal reflection within the solid rod.

Any light transmitting material may be used to construct the light reflecting unit according to embodiments of the disclosure provided the material has a refractive index such that the light received by the light reflecting unit is reflected within the light reflecting unit by the process of total internal reflection. Examples of material the solid rod light reflecting unit 804 may be constructed from include, but are not particularly limited to, silica-based glass, crystalline materials, acrylic glass or any type of plastic optical fiber. The solid rod may further be constructed from a single material, or may be a composite material. It will be appreciated that a solid rod light reflecting unit 804 may be either rigid of flexible as long as light travels along a number of paths having a predetermined number of reflections within the light reflecting unit according to a portion of the first aperture from which the light originated The solid rod light reflecting unit 804 which reflects light by total internal reflection may have an optical coating on the external surface in order to modify the optical properties of the unit. For example, the external surface of the rod which receives the light from the light receiving unit 802 may be coated with an antireflective coating in order to increase the transmission of light into the light reflecting unit 804. The external surface of the rod which transmits light to the light output unit may be coated in order to improve the transmission of light from the light reflecting unit 804 to the light output unit 806.

Furthermore, at least the sides 804B of the light reflecting unit 804 may be covered in order to restrict light other than the light received by the light receiving unit 802 from entering the light reflecting unit 804. Such covering may comprise a solid casing or may be an optical coating for example. The covering may also restrict light from the light receiving unit 802 from escaping the light reflecting unit 804 except from through an exit portion of the light reflecting unit.

Figure 5B:
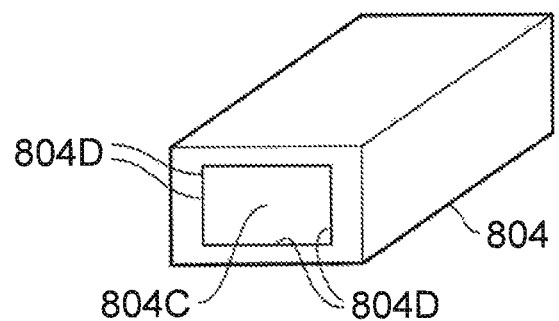
FIG. 5B shows a light reflecting unit according to embodiments of the disclosure.

FIG. 5B shows a light reflecting unit 804 according to embodiments of the disclosure. The light reflecting unit 804 may comprise a tunnel configured such that the light received by the light receiving unit is reflected along a number of paths within the light reflecting unit 804 by reflections within the light reflecting unit 804 by reflection off the internal surfaces of the tunnel.

The light reflecting tunnel may comprise of a hollow portion 804C through which light from the light receiving unit 802 enters and which extends along the length of the light reflecting unit 804. That is, light whose optical path travels along the axis of the light reflecting unit 804 may enter and exit the light reflecting tunnel without contacting any surface. The light reflecting unit 804 according to embodiments of the disclosure may consist of an external shell or covering 804B which may provide structure to the light reflecting unit 804 and may restrict light other than light received by the light receiving unit 802 from entering the light reflecting unit 804.

The internal surfaces 804D of the tunnel light reflecting unit 804 should be configured such that light is reflected off the internal surfaces of the tunnel. For example, the internal surfaces 804D may have a reflective coating or may comprise a mirrored surface. The tunnel light reflecting unit 804 may constructed from a single material or may be a composite material. For example, the mirrored surfaces 804D of the light reflecting tunnel 804 may consist of glass mirrors coated with a material such as aluminium or silver, or any type of dielectric coated substrate.

It will be appreciated that any other type of light reflecting unit 804 may be included in the imaging device 800 to effect, as long as the light travels along a number of paths having a predetermined number of reflections within the light reflecting unit according to a portion of the first aperture from which the light originated.

Light from the light reflecting unit 804 enters the light output unit 806. The light output unit 806 is configured to output at least a subset of the paths of light reflected by the light reflecting unit 804 as a plurality of second images, the second images having a focal length associated with the predetermined number of reflections experienced by the corresponding paths of light through the light reflecting unit 804.

The light output unit 806 may comprise a single lens or may comprise any arrangement or configuration of lenses including, for example, biconvex, piano-convex, plano-concave and biconcave lenses. It will be appreciated that the light output unit 806 may be any other type of instrument, as long as light travels through the light output unit 806 from the light reflecting unit 804 of the imaging device 800. According to embodiments of the disclosure, the light output unit 806 may be configured to focus the angularly split light from the light reflecting unit as a plurality of second images corresponding to only one portion of the aperture and corresponding to a certain visual perspective of the scene. That is, the light output unit 806 spatially separates the angularly split light emerging from the light reflecting unit 804 into a plurality of distinct second images.

The use of a light output unit 806 according to embodiments of the disclosure enables the imaging device 800 to convert a first image into a plurality of second images without substantially increasing the size or cost of the imaging device itself. As such, the imaging device may be efficiently incorporated into pre-existing single lens imaging instruments.

Figure 6:
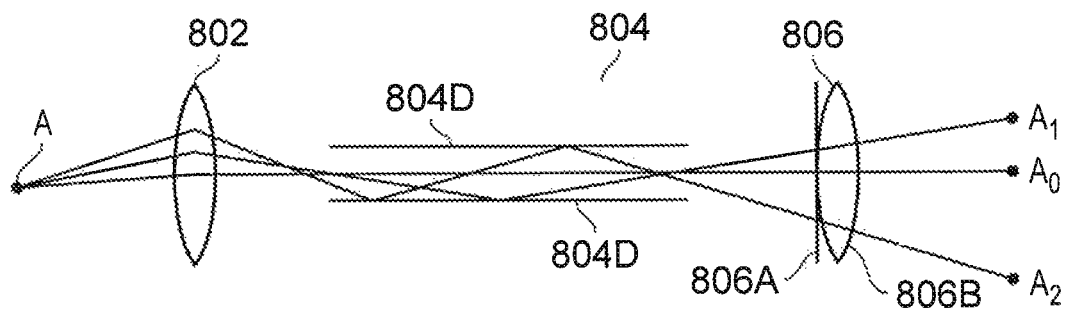
FIG. 6 shows a depiction of the optical path of light through the imaging device according to embodiments of the disclosure.

FIG. 6 shows a depiction of the optical path of light through the imaging device 800 according to embodiments of the disclosure. It will be appreciated that only a selection of light paths from the object A through the light receiving unit 802 is shown. Furthermore, only a simplified version of a single optical plane is shown in this depiction. The light paths each travel through a different portion of the first aperture before entering the light reflecting unit 804 and as such, each captures a different visual perspective of the object A.

As shown in FIG. 6, the light output unit 806 may further comprise a sub-image aperture 806A, located before the focusing portion 806B (the focusing portion 806B comprising any of the lens, lens arrangement of other instruments described above). The sub-image aperture may be, for example, a circular aperture constructed from any optically thick material, and may further restrict the number of paths of light which enter the light output unit 806 from the light reflecting unit 804 to a subset of paths having of light. This enables adjustment of the light output unit and may be used to dictate the configuration of the plurality of second images.

Upon entering the light reflecting unit, the light paths are reflected various numbers of time within the light reflecting unit. For example, the light which has originated through the central portion of the first aperture travels directly through the light reflecting unit 804 while experiencing no reflections. The non-reflected central light then passes from the light reflecting unit 804 to the light output unit 806. The non-reflected central light is then output by the light output unit 806 as a central second image $A_0$.

Light that originated from a second portion of the first aperture (located above the central portion of the aperture) enters the light reflecting unit 804 on a path towards the lower internal surface 804D of the light reflecting unit 804. The light from object A travelling along this light path experiences a single reflection off the lower internal surface 804D of the light reflecting unit 804 before reaching the light output unit 806. The light output unit 806 outputs the light that experienced a single reflection off the lower internal surface 804D of the light reflecting unit as a second image $A_1$.

The imaging device 800 depicted in FIG. 6 is configured such that light originating from a third portion (located above the second portion of the first aperture) enters the light reflecting unit 804 on an optical path towards the lower internal surface 804D of the light reflecting unit 804. The optical path of light from the third portion of the first aperture is then further reflected off the upper internal surface 804D of the light reflecting unit 804 before reaching the light output unit 806. The light output unit 806 outputs the light that experienced a first reflection off the lower internal surface 804D and a second reflection off the upper internal surface of the light reflecting unit 804 as a second image $A_2$.

Each of the second images $A_0$, $A_1$ and $A_2$ comprises a complete optical representation of the object A captured from a distinct visual perspective. It will be appreciated that FIG. 6 shows only a subset of the possible paths through the imaging device 800 in a single image plane, and that many further second images of the object A may be output by the output unit 806 of the imaging device 800. For example, depending on the configuration of the imaging device 800, light may be reflected up to any number of times within the light reflecting unit 804 and from any combination of sides of the light reflecting unit 804.

Figure 7:
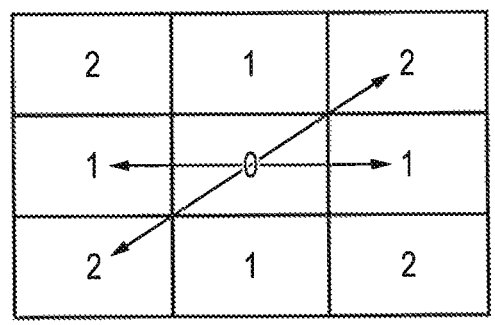
FIG. 7 shows a diagram of a subset the plurality of second images output by the light output unit.

FIG. 7 shows a diagram of a subset the plurality of second images output by the light output unit 806. In this example, the light reflecting unit is a quadratic light reflecting unit 804, and the light output unit 806 is configured to output the subset of the plurality of second images as a grid of second images. The number of reflections that the corresponding portions of light experienced in the light reflecting unit is indicated by the number shown in each of the second images. In this configuration, the light output unit 806 outputs nine second images, or nine different visual perspectives, of the object or scene. That is, there is a single second image of light paths experiencing no reflections through the light reflection unit, four second images of light paths experiencing reflections off one of the four internal surfaces 804D of the light reflecting unit and four second images of light paths experiencing reflections off two of the four internal surfaces 804D of the light reflecting unit. Each of the second images is formed from light originating from a distinct portion of the first aperture. The greatest visual disparity between the different perspectives of the object or scene is obtained between image perspectives, or second images, from light originating from contrasting portions of the first aperture. That is, the baseline, or shift in perspective, which can be obtained, depends on the size of the first aperture.

That is, the imaging device 800 according to embodiments of the disclosure is able to produce second images having a plurality of visual perspectives from a first image.

Figure 8:
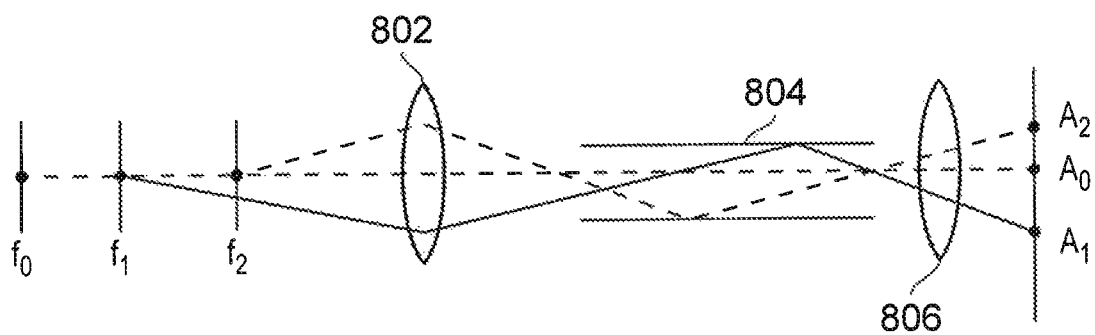
FIG. 8 shows a depiction of the optical path of light through the imaging device according to embodiments of the disclosure.

FIG. 8 shows a depiction of the optical path of light through the imaging device 800 according to embodiments of the disclosure. The path length experienced by light through the light reflecting unit 804 is a function of the number of reflections experienced by the light within the light reflecting unit 804. That is, light which passes directly through the light reflecting unit 804 will travel along a shorter path length within the light reflecting unit 804 than light which experiences multiple reflections off the internal surfaces of the light reflecting unit 804. As such, the focal length for each of the plurality of second images output by the light output unit 806 varies according to the number of reflections experienced by light within the light reflecting unit 804. As shown in FIG. 8, the in-focus position of an object in the central second image $A_0$ (corresponding to light which has experienced no reflections within the light reflecting unit) is at a position $f_0$.

The in-focus position of an object in the second image $A_1$ which has been output by the light output unit 806 (corresponding to light which has experienced a single reflection within the light reflecting unit) is shifted an amount corresponding to the additional path length within the light reflecting unit 804 to a position $f_1$. As such, an object located at position $f_1$ will be in-focus in the second images formed from light experiencing a single reflection within the light reflecting unit 804, but out of focus in the central second image formed from light experiencing no reflections within the light reflecting unit 804.

Finally the light which has experienced reflections off two of the internal surfaces within the light reflecting unit is shifted with respect to $f_0$ and $f_1$ by an amount corresponding to the additional path length within the light reflecting unit 804 to a position $f_2$.

It will be appreciated that while only a subset of the paths of light through the imaging device 800 in one plane are shown in FIG. 8, there are a plurality of paths through the imaging device 800. Since the shift in focal position is a function of the number of reflections of light off the internal surfaces 804D of the light reflecting unit 804 all second images experiencing the same number of reflections have the same focal position regardless of which internal surfaces 804D of the light reflecting unit 804 the light was reflected off. For example, referring to FIG. 7, the plurality of second images have three distinct focal positions: $f_0$ for the central path experiencing no reflections, $f_1$ for the four paths experiencing one reflection off the internal surfaces of the light reflecting unit and $f_2$ for the four paths experiencing two reflections off the internal surfaces of the light reflecting unit 804.

That is, the imaging device 800 according to embodiments of the disclosure is able to produce spatially separated second images for different focal distances within the first image.

Configuration of the Imaging Device:

It will be appreciated by that the particular configuration of the above described elements of the imaging device 800 is not fixed to any particular arrangement and may be adapted according to the intended use of the imaging device. For example, the relationship between the first aperture of the imaging device, the light reflecting unit 804 and the number of second images output by the light output unit 806 is governed by the equation:

$$\delta = \tan^{-1}\left(\frac{\frac{N}{2}*S + \frac{A}{2}}{L}\right)$$

where $\delta$ is the first aperture cone, N is the number second images output by the light output unit 806, S is the size of the original image sensor, L is the length of the light reflecting unit 804 and A is the sub-image aperture.

It will be appreciated that the width and height of the light reflecting unit 804 is determined at least in part by the original image or sensor size, and as such, the number of reflections within the light reflecting unit 804 for a given imaging device 800 may be determined by the length of the light reflecting unit 804.

Figure 9:
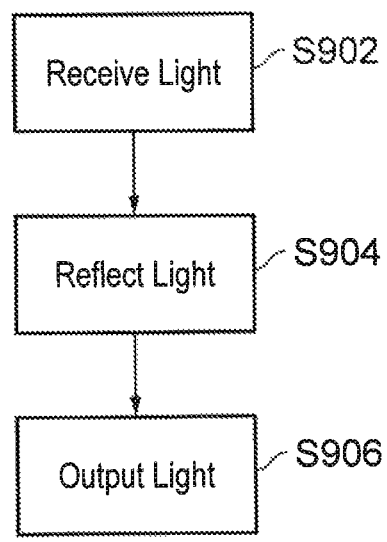
FIG. 9 is a flow chart of the method steps of converting a first image into a plurality of second images according to embodiments of the disclosure.

Imaging Method:

According to embodiments of the disclosure, there is an imaging method for converting a first image into a plurality of second images. FIG. 9 is a flow chart of the method steps of converting a first image into a plurality of second images according to embodiments of the disclosure. The method comprises a first step S902 of receiving light of first image of an object or scene. This step may be performed, for example, by the light receiving unit 802 of the imaging device 800, or any suitable instrument.

The method further comprises a step of reflecting the light along a number of paths having a predetermined number of reflections according to a portion of a first aperture from which the light originated 5904. This step may be performed, for example, by the light reflecting unit 804 of the imaging device 800, or any suitable instrument.

Finally, the method comprises a step of outputting at least a subset of the reflected paths of light as a plurality of second images, the second images having a focal length associated with the predetermined number of reflections experienced by the corresponding paths of light S906. This step may be performed, for example, by the light output unit 806 of the imaging device 800, or any suitable instrument.

Figure 10:
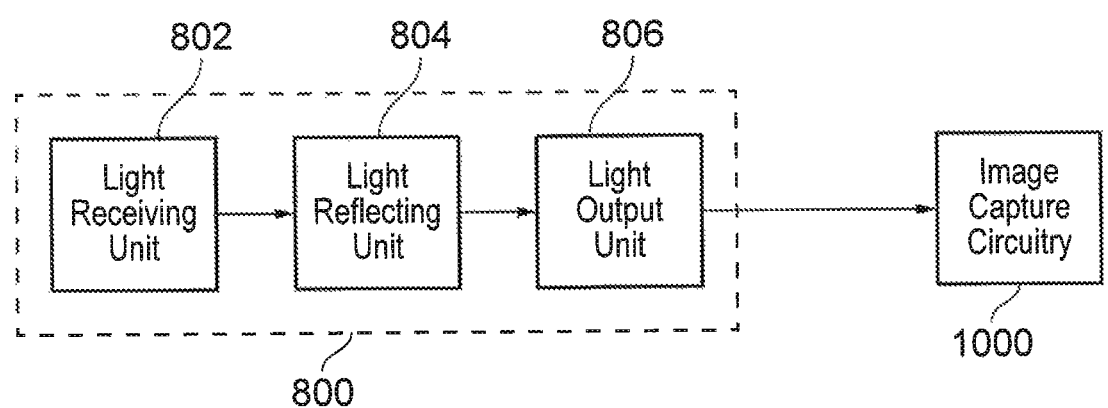
FIG. 10 depicts an imaging system according to embodiments of the disclosure.

Imaging System:

Furthermore, according to embodiments of the disclosure, there is an imaging system for converting a first image into a plurality of second images. FIG. 10 depicts an imaging system according to embodiments of the disclosure. The imaging system comprises an imaging device 800 (according to any of the embodiments of the disclosure) and image capture circuitry 1000 configured to capture information constituting the plurality of second images output by the light output unit 806.

The image capture circuitry 1000 may be placed at the image plane of the light output unit 806 of the imaging device 800. That is, according to embodiments of the disclosure, the light output unit 806 outputs the plurality of second images to the image capture circuitry 1000 of the imaging system. The image capture circuitry 1000 may comprise an image sensor such as a charged coupled device (CCD), complementary metal oxide semiconductor (CMOS) or organic CMOS image sensor for example. The image capture circuitry 1000 is not limited to these examples and it will be appreciated that any image capture circuitry may be used to effect as long as the image capture circuitry 1000 is able to capture information constituting the plurality of second image output by the light output unit 806.

The information captured by the image captured circuitry 1000 may, for example, comprise an electronic image of the plurality of second images. The electronic image may be a single electronic image comprising the plurality of second images output by the image output circuitry 806. Alternatively, the image capture circuitry 1000 may capture a separate electronic image for each of the second images output by the light output unit 806. Alternatively, the image capture circuitry 1000 may be configured to capture a plurality of electronic images, each comprising a plurality of second images.

Figure 11:
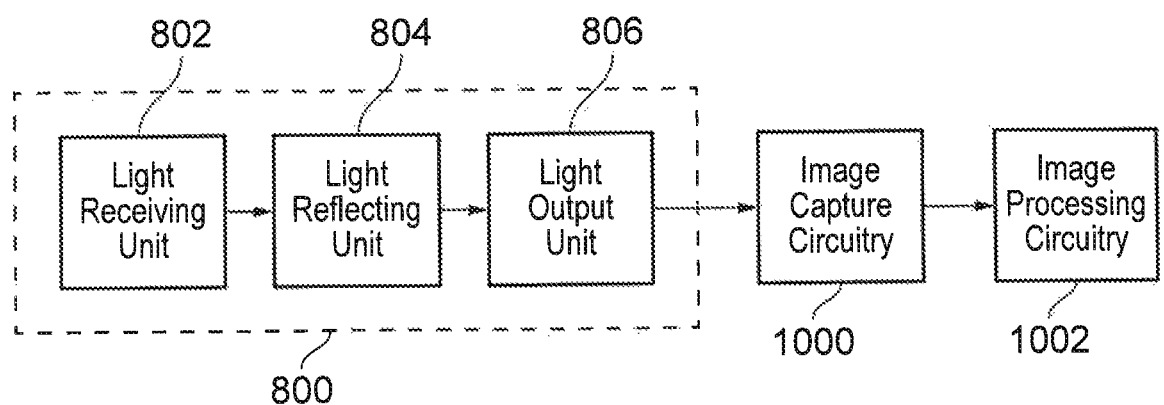
FIG. 11 depicts a imaging system according to embodiments of the disclosure.

FIG. 11 depicts an imaging system according to embodiments of the disclosure. The imaging system comprises an imaging device 800 and image capture circuitry 1000 configured to capture information constituting the plurality of second images output by the light output unit 806. The imaging system according to the embodiment of the disclosure further comprises image processing circuitry 1002 configured to process the information constituting the plurality of second images captured by the image capture circuitry 1000.

For example, the image capture circuitry 1000 may be configured to output the captured information directly to the image processing circuitry 1002 via a communication link, or indirectly via a storage medium. The communication link may be a wired link between the image capture circuitry 1000 and the image processing circuitry 1002. Alternatively, the captured information may be transmitted to the image processing circuitry 1002 by a wireless link. The image processing circuitry 1002 is configured to perform processing on the information captured by the image capture circuitry.

Figure 12:
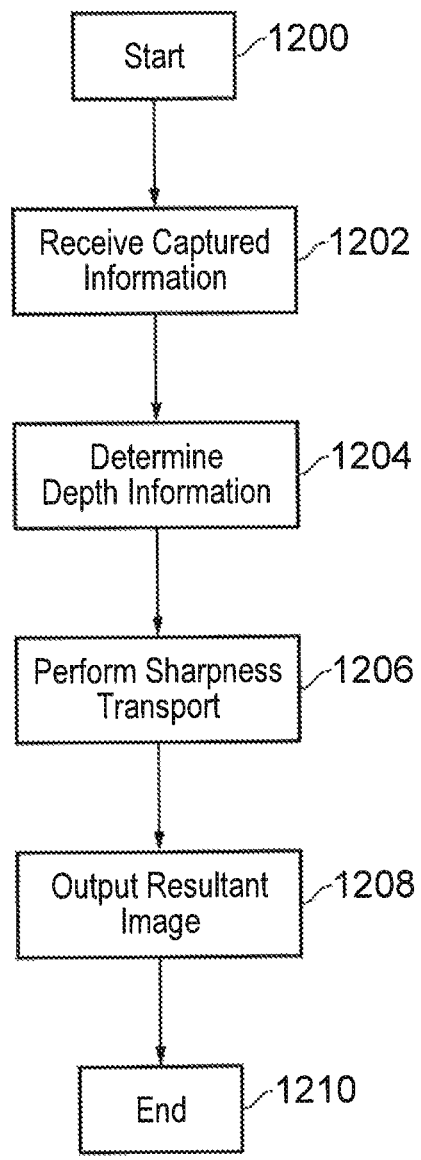
FIG. 12 is a flow chart of the processing steps performed by the image processing circuitry according to an embodiment of the disclosure.

FIG. 12 is a flow chart of the processing steps performed by the image processing circuitry 102 according to an embodiment of the disclosure.

Processing begins at step 1200 and proceeds to step 1202. In step 1202 the image processing circuitry 1002 receives the captured information constituting the plurality of second images. As stated, the captured information may be received directly from the image capture circuitry 1000, or may be received indirectly via a storage medium. However, once the image processing circuitry 1002 receives the captured information, processing proceeds to step 1204.

In step 1204 the image processing circuitry 1002 is configured to determine depth information from the captured information. According to embodiments of the disclosure, the image processing circuitry 1002 is configured to determine from the information constituting the plurality of second images a first depth information using a focal length of at least one of the plurality of second images. Referring again to FIG. 7, the plurality of second images output by the light output unit 806 have a predetermined focal length which is a function of the number of reflections the corresponding path of light has experienced within the light reflecting unit 804 of the imaging device 800. As such, the image processing circuitry 1002 may determine the depth information of the scene depending on the level of focus of the scene across the plurality of second images. For example, if an object within a scene appears in focus in the central second image (corresponding to paths of light that have experienced no reflections within the light reflecting unit) then the object within the scene is determined by the image processing circuitry 1002 to be a depth corresponding to $f_0$. However, if the object within the scene appears in focus in the plurality of second images which have experienced two reflections within the light reflecting unit 804 then the image processing circuitry 1002 determines that the object is at a depth corresponding to $f_2$.

It will be appreciated that the image processing circuitry 1002 is not limited to determining depth of objects that appear in focus in at least one of the plurality of second images. Rather, the image processing circuitry 1002 may be configured to determine depth information of the scene through a comparison of the focus level for a region of the scene between a plurality of second images having a different focal depth.

The image processing circuitry 1002 may be configured, for example, to determine the level of focus of an object or scene in a second image based on the sharpness level of the object or scene in each sub-image. Sharpness determination may be based on an edge width measurement (EWM) within a second image of through comparison of a region across a plurality of second images corresponding to optical paths experiencing a different number of reflections within the light reflecting unit 804. It will be appreciated that the image processing unit 1002 may be configured to determine the level of focus in a second image (or a region of a second image) through any suitable method using the captured information.

According to embodiments of the disclosure, in step 1204 the image processing circuitry 1002 is further configured to determine depth information from disparity information between at least two of the plurality of second images. Referring again to FIG. 7, the plurality of second images output by the image output unit 806 each correspond to an image of the object or scene from light originating from only one part of the image aperture and therefore correspond to a certain visual perspective of the scene. The plurality of second images therefore correspond to a multiview of the original image of the object or scene where the greatest disparity between the visual perspectives of the object or scene is obtained from the second images corresponding to light that originated from opposing sections of the first aperture (leading to the greatest baseline). As such, the image processing circuitry 1002 may be configured to use at least two of the second images (visual perspectives of the object or scene) in order to determine depth information.

For example, the image processing circuitry 1002 may be configured to use binocular disparity and parallax in order to triangulate the distance to an object. The arrows in FIG. 7 show two example baselines through which the image processing circuitry 1002 may determine depth information by binocular disparity. Using the plurality of second image of second images the image processing circuitry 1002 can obtain multiple measures of the depth of an object, which improves the accuracy of the depth information determined by the image processing circuitry 1002.

In step 1204 the information processing circuitry 1002 may also compare, collate and/or combine the depth information determined from the focal length information and the depth information determined from the visual disparity in order to further improve the accuracy of the depth information determined from the captured information constituting the plurality of second images output by the image output unit 806.

Furthermore, the image processing circuitry 1002 may calculate depth information for a region or a plurality of regions within an image and further perform a depth propagation calculation on the image in order to generate depth information for the entire image.

Once the depth information has been determined in step 1204, processing proceeds to step 1206.

According to embodiments of the disclosure, in step 1206 the image processing circuitry 1002 is further configured to use at least one depth information determined from the information constituting the plurality of second images in order to perform a sharpness transport function between at least two of the plurality of second images. As shown in FIG. 8, the plurality of second images have a predetermined focal length shift for each optical path length through the image reflecting unit 804. Therefore, as described above, the in-focus distance for an object varies across the plurality of second images depending on the number of reflections light corresponding to the second image has experienced within the light reflecting unit 804.

Certain regions of the scene located at a first depth may have high levels of detail, or sharpness information, if they are in focus in at least one second image corresponding to a first number of reflections within the light reflecting unit 804. Other regions of the scene located at a second depth may have higher levels of depth may have higher levels of detail, or sharpness information, if they are in focus in at least one other second image corresponding to a second number of reflections within the light reflecting unit 804. Accordingly, the image processing circuitry 1002 may be configured to combine the determined depth information and the determined sharpness information in order to perform a sharpness transport to transport high spatial frequency from the plurality of second images in order to generate a resultant image having an extended depth of field. Processing proceeds to step 1208.

In step 1208, the image processing circuitry 1002 is configured to output the resultant image having an extended depth of field. For example, the image processing circuitry 1002 may be configured to output the resultant image, or information constituting the resultant image, for display on an external display device. Alternatively, the image processing circuitry 1002 may be configured to output the resultant image, or information constituting the resultant image for storage in a storage device or for further processing in an external processing device. The image processing circuitry 1002 may be configured to output the resultant image to multiple sources such as the external display device and an external storage device. Processing ends in step 1210.

Figure 13:
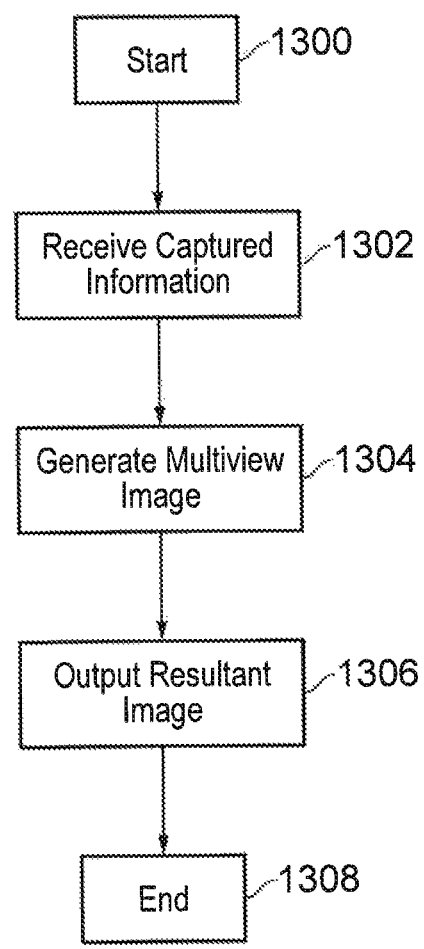
FIG. 13 is a flow chart of the processing steps performed by the image processing circuitry according to an embodiment of the disclosure.

FIG. 13 is a flow chart of the processing steps performed by the image processing circuitry 1002 according to an embodiment of the disclosure.

Processing begins at step 1300 and moves on to step 1302. In step 1302 the image processing circuitry 1002 receives the captured information constituting the plurality of second images. This step is equivalent to step 1202 described above, and for brevity will not be described here in detail again. Processing proceeds to step 1304.

In step 1306 the image processing circuitry 1002 is configured to generate a multiview image of the object or scene. For example, each of the plurality of the second images output by the light output unit 806 of the imaging device 800 are formed from light that originated from a distinct portion of the first aperture and as such, comprise a certain visual perspective of the scene. The image processing circuitry 1002 may combine at least two of the plurality of second image in order to generate a 3D resultant image of the object or scene. Furthermore, in step 1306 the image processing circuitry 1002 may be configured to combine any number of the plurality of second images in order to generate a multiview image of the scene, or multiple unique 3D images of the scene. Processing proceeds to step 1306.

In step 1306 the image processing circuitry 1002 is configured to output the resultant multiview or 3D image, or 3D images. This step is equivalent to step 1208 described above, and for brevity will not be described here in detail again. Processing ends in step 1308.

It will be appreciated that the image processing circuitry 1002 is not particularly limited to the above processing methods, and that the image processing circuitry 1002 may perform any suitable process on the information constituting the plurality of second images output by the light output unit 806 of the imaging device 800. For example, the imaging processing circuitry 1002 may be configured to perform any image processing or manipulation including but not limited to image compression, image sharpening, image smoothing, image cropping, image brightness adjustment and/or image alignment. Such image processing steps may be performed directly on the captured information constituting the plurality of second images and/or may be performed on the resultant images produced by the image processing circuitry 1002 described above.

Figure 14:
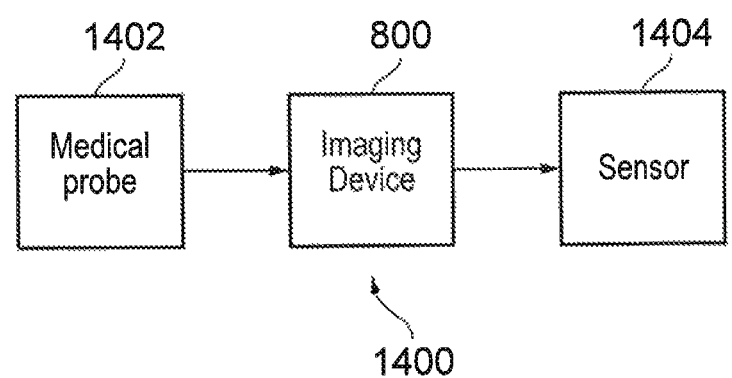
FIG. 14 is a depiction of a medical device according to embodiments of the disclosure.

Imaging Device as Part of a Medical Instrument:

Furthermore, according to embodiments of the disclosure, the imaging device 800, or the imaging system, may be included as part of a new or pre-existing medical device. FIG. 14 is a depiction of a medical device 1400 according to embodiments of the disclosure. The medical device 1400 comprises a medical probe 1402, an imaging device 800 and a sensor 1404.

The medical device 1400 according to embodiments of the disclosure may comprise, or form part of, an endoscope 5001, laparoscope, microscope or any medical imaging device. The medical probe 1402 may comprise, for example, any of the front end optics of the medical device 1400 such as an objective lens or lens system. That is, the medical probe corresponds to the optics which forms the original image of an object or scene.

The sensor 1404 may comprise any sensor originally used in the medical instrument 1400, and may be for example an image sensor such as a charged coupled device (CCD), complementary metal oxide semiconductor (CMOS) or organic CMOS image sensor.

The imaging device 800 is situated between the medical probe 1402 and the sensor 1404. For example, the original sensor position may be adapted and the medical imaging device 800 may be placed at the original sensor position of the medical device 1400 such that the imaging device 800 is placed at the image plane of the medical probe 1402.

As such, the original image captured by the new or pre-existing medical device 1300 is converted into a plurality of second images of the object or scene. Each of the plurality of second images comprises a unique visual perspective of the object or scene. The plurality of second images have a variety of focal depths determined by the number of reflections the corresponding paths of light experienced within the light reflecting unit 804 of the imaging device 800.

Imaging Device as Part of an Industrial Instrument:

Furthermore, according to embodiments of the disclosure, the imaging device 800, or the imaging system, may be included as part of a new or pre-existing industrial imaging instrument. The imaging device according to embodiments of the disclosure could be employed to effect in an industrial imaging device such as an industrial endoscopic device. For example, embodiments of the disclosure could be used in architectural endoscopy, whereby a scale version of a new building or complex can be correctly viewed from the perspective of a person walking through the architectural creation improving the visualisation, design and construction of proposed buildings.

Embodiments of the disclosure could be used for internal visualisation of works of engineering. For example, an imaging device according to embodiments of the disclosure could be used to view the interior of underground pipe systems, such as water pipes, in order to locate leaks or generally survey the structure. An imaging device according to embodiments of the disclosure could also be used for quality control and internal inspection of other mechanical systems such as turbines and engine components.

Alternatively, embodiments of the disclosure could be used in the security and surveillance industry. For example, an imaging device according to embodiments of the disclosure could be used to conduct surveillance in an area where the presence of a person is restricted, such as in an enclosed area or a very tight space.

In all these applications, an imaging device 800 according to embodiments of the disclosure which may be included as part of a new or pre-existing industrial imaging instrument, able to produce depth information and capture 3D images using a single objective lens would be advantageous. It will be appreciated that the above are merely examples of possible industrial applications of an imaging device according to embodiments of the disclosure, and many further applications of the imaging device are possible.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Various embodiments of the present disclosure are defined by the following numbered clauses:

1) An imaging device for converting a first image into a plurality of second images, the imaging device comprising: a light receiving unit having a first aperture configured to receive light of the first image;
a light reflecting unit configured to reflect the light received by the light receiving unit along a number of paths having a predetermined number of reflections within the light reflecting unit according to a portion of the first aperture from which the light originated; and
a light output unit configured to output at least a subset of the paths of light reflected by the light reflecting unit as a plurality of second images, the second images having a focal length associated with the predetermined number of reflections experienced by the corresponding paths of light through the light reflecting unit.

2) The imaging device according to any Clause, wherein the light reflecting unit comprises a solid rod having a refractive index such that the light received by the light receiving unit is reflected along the number of paths having a predetermined number of reflections within the light reflecting unit by total internal reflection within the solid rod.

3) The imaging device according to any Clause, wherein the light reflecting unit comprises a tunnel configured such that the light received by the light receiving unit is reflected along the number of paths having a predetermined number of reflections within the light reflecting unit by reflection off the internal surfaces of the tunnel.

4) The imaging device according to any Clause, wherein the light reflecting unit is a quadratic light reflecting unit and the plurality of second images are output by the light output unit as a grid.

5) The imaging device according to any Clause, wherein the light output unit is configured such that the subset of the paths of light output by the light output unit comprises light experiencing no reflections, light experiencing a single reflection and light experiencing a double reflection within the light reflecting unit.

6) An imaging system for converting a first image into a plurality of second images, the imaging system comprising: an imaging device according to Clause 1; and
image capture circuitry configured to capture information constituting the plurality of second images output by the light output unit.

7) The imaging system according to any Clause, further comprising image processing circuitry configured to process the information constituting the plurality of second images captured by the image capture circuitry.

8) The imaging system according to any Clause, wherein the image processing circuitry is further configured to determine from the information constituting the plurality of second images a first depth information using a focal length of at least one of the plurality of second images.

9) The imaging system according to any Clause, wherein the image processing circuitry is further configured to determine from the information constituting the plurality of second images disparity information between at least two of the plurality of second images.

10) The imaging system according to any Clause, wherein the image processing circuitry is further configured to determine a second depth information using the disparity information.

11) The imaging system according to any Clause, wherein the image processing circuitry is further configured to use at least one depth information determined from the information constituting the plurality of second images in order to generate a resultant image having an extended depth of field.

12) The imaging system according to any Clause, wherein generating the resultant image having an extended depth of field further comprises performing a sharpness transfer function between the plurality of second images.

13) The imaging system according to any Clause, wherein the image processing circuitry is further configured to use the information constituting the plurality of second images in order to generate a resultant multiview image.

14) A medical device comprising an imaging device according to any Clause positioned between a probe and an image sensor.

15) A method of operating an imaging device for converting a first image into a plurality of second images, the method comprising:
controlling a light receiving unit of the imaging device having a first aperture to receive light of the first image;
controlling a light reflecting unit of the imaging device to reflect the light received by the light receiving unit along a number of paths having a predetermined number of reflections within the light reflecting unit according to a portion of the first aperture from which the light originated; and
controlling a light output unit of the imaging device to output at least a subset of the paths of light reflected by the light reflecting unit as a plurality of second images, the second images having a focal length associated with the predetermined number of reflections experienced by the corresponding paths of light through the light reflecting unit.

16) A program for controlling a computer to perform a method according to clause 15.

17) A storage medium storing a program according to clause 16.

The invention claimed is:

1. An imaging system for converting a first image into a plurality of second images, the imaging system comprising:
a first lens having a first aperture configured to receive light of the first image;
a light reflector configured to reflect the light received by the first lens along a number of paths having a predetermined number of reflections within the light reflector according to a portion of the first aperture from which the light originated;
a second lens configured to output at least a subset of the paths of light reflected by the light reflector as a plurality of second images, the second images having a focal length associated with the predetermined number of reflections experienced by the corresponding paths of light through the light reflector;
image capture circuitry configured to capture information constituting the plurality of second images output by the second lens; and
image processing circuitry configured to process the information constituting the plurality of second images captured by the image capture circuitry and to determine, from the information constituting the plurality of second images, a first depth information for forming a three-dimensional image using a focal length of at least one of the plurality of second images based on a number of reflections.

2. The imaging system according to claim 1, wherein the light reflector comprises a solid rod having a refractive index such that the light received from the first lens is reflected along the number of paths having a predetermined number of reflections within the light reflector by total internal reflection within the solid rod.

3. The imaging system according to claim 1, wherein the light reflector comprises a tunnel configured such that the light received from the first lens is reflected along the number of paths having a predetermined number of reflections within the light reflector by reflection off the internal surfaces of the tunnel.

4. The imaging system according to claim 1, wherein the light reflector is a quadratic light reflecting unit and the plurality of second images are output by the second lens as a grid.

5. The imaging system according to claim 1, wherein the second lens is configured such that the subset of the paths of light output by the second lens comprises light experiencing no reflections, light experiencing a single reflection and light experiencing a double reflection within the light reflector.

6. The imaging system according to claim 1, wherein the image processing circuitry is further configured to determine from the information constituting the plurality of second images disparity information between at least two of the plurality of second. images.

7. The imaging system according to claim 6, wherein the image processing circuitry is further configured to determine a second depth information using the disparity information.

8. The imaging system according to claim 1, wherein the image processing circuitry is further configured to use at least one depth information determined from the information constituting the plurality of second images in order to generate a resultant image having an extended depth of field.

9. The imaging system according to claim 8, wherein generating t resultant image having an extended depth of field further comprises performing a sharpness transfer function between the plurality of second images.

10. The imaging system according to claim 1, wherein the image processing circuitry is further configured to use the information constituting the plurality of second images in order to generate a resultant multiview image.

11. The imaging system according to claim 1, wherein the image processing configured to compare to focus levels of the plurality of second images determine the first depth information.

12. A medical device comprising an imaging system according to claim 1 positioned between a probe and an image sensor.

13. A method of operating an imaging device for converting a first image into a plurality of second images, the method comprising:

controlling a first lens of the imaging device having a first aperture to receive light of the first image;

controlling a light reflector of the imaging device to reflect the light received by the first lens along a number of paths having a predetermined number of reflections within the light reflector according to a portion of the first aperture from which the light originated;

controlling a second lens of the imaging device to output at least a subset of the paths of light reflected by the light reflector as a plurality of second images, the second images having a focal length associated with the predetermined number of reflections experienced by the corresponding paths of light through the light reflector;

capturing information constituting the plurality of second images output by the second lens; and processing the information constituting the plurality of second images captured, processing including determining a first depth information for forming a three-dimensional image using a focal length of at least one of the plurality of second images by comparing focus levels of the plurality of second images based on a number of reflections.

14. The method according to claim 13, wherein determining a first depth information includes comparing focus levels of the plurality of second images.

15. A non-transitory computer readable medium having stored thereon a program that, when executed by a computer, causes the computer to perform a method according to claim 13.

16. An imaging system for converting a first image into a plurality of second images, the imaging system comprising:
a first lens having a first aperture configured to receive light of the first image;
a light reflector configured to reflect the light received by the first lens along a number of paths having a predetermined number of reflections within the light reflector according to a portion of the first aperture from which the light originated;
a second lens configured to output at least a subset of the paths of light reflected by the light reflector as a plurality of second images, the second images having a focal length associated with the predetermined number of reflections experienced by the corresponding paths of light through the light reflector;
image capture circuitry configured to capture information constituting the plurality of second images output by the second lens; and
image processing circuitry configured to process the information constituting the plurality of second images captured by the image capture circuitry, wherein the image processing circuitry is further configured to use the information constituting the plurality of second images from different numbers of reflections to generate multiple unique three-dimensional images.

* * * * *